(12) United States Patent
Andersen et al.

(10) Patent No.: US 7,089,316 B2
(45) Date of Patent: Aug. 8, 2006

(54) SYSTEM AND METHOD FOR SERVICE DEVELOPMENT OVER CONTENT-SPECIFIC SESSIONS

(75) Inventors: Janet S. Andersen, Apex, NC (US); Daniel V. Conrad, Cary, NC (US); Ratna S. Garimella, Cary, NC (US); Brett G. King, Apex, NC (US); Gregor Iain McElvogue, Raleigh, NC (US); David E. Taber, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 10/160,909

(22) Filed: Jun. 3, 2002

(65) Prior Publication Data

US 2003/0225827 A1    Dec. 4, 2003

(51) Int. Cl.
*G06F 15/16* (2006.01)
(52) U.S. Cl. .............. 709/229; 709/217; 709/219; 709/227; 725/104
(58) Field of Classification Search ........ 709/217–219, 709/226, 229; 713/168; 725/104
See application file for complete search history.

(56) References Cited

U.S. PATENT DOCUMENTS

| | | | | |
|---|---|---|---|---|
| 5,963,915 A | * | 10/1999 | Kirsch | 705/26 |
| 6,058,426 A | * | 5/2000 | Godwin et al. | 709/229 |
| 6,516,350 B1 | * | 2/2003 | Lumelsky et al. | 709/226 |
| 6,529,950 B1 | * | 3/2003 | Lumelsky et al. | 709/218 |
| 6,721,272 B1 | * | 4/2004 | Parnafes et al. | 370/235 |
| 6,763,468 B1 | * | 7/2004 | Gupta et al. | 726/2 |

OTHER PUBLICATIONS

Blair, Larry, "Enabling Broadband Services with Subscriber Management Systems," *Telecommunications Online*, Feb. 1999 (3 pages).
"PPPoE: The Fast Track to Broadband Data Services," *Redback Reading*, Redback Networks (3 pgs).
"Architectural Options for Subscriber Access to Broadband Services," Efficient Networks (3 pages).
"Architectural Options for Subscriber Access to Broadband Services," Efficient Networks White Paper, First Quarter 2000 (6 pages).

(Continued)

*Primary Examiner*—Saleh Najjar
*Assistant Examiner*—Liang-che Alex Wang
(74) *Attorney, Agent, or Firm*—VanLeeuwen & VanLeeuwen; Gerald R. Woods

(57) ABSTRACT

A system and method for deploying a resource over a content-specific session is provided. A client requests a resource from a service provider, such as an ISP. The service provider provisions the order and records the order in a data store. A service login identifier is created with attributes, such as bandwidth, that correspond to the requested resource, such as a movie or network accessible storage. The client logs into the service provider using the service login identifier and the client's normal password. The service login is authenticated and a session is established using the attributes that correspond to the requested resource. The client is directed to the requested resource by using a resource URL that was provided by the service provider, such as a URL to a requested movie or network accessible storage.

25 Claims, 7 Drawing Sheets

OTHER PUBLICATIONS

Penno, et. al, "ISP Selection in Open Access Networks," Network Working Group, Mar. 2001.

Sarmiento, Romy, "PPP Over DSL Broadband Testing," Spirent Communications Magazine, 3rd-4th Quarter 2001 (3 pages).

"IBM, Redback Networks and Tivoli Developer Deliver Rapid IP Services for e-Business Solutions," IBM Press Release, Jun. 2001, 10 pages total.

*Digital Subscriber Line (DSL) Solutions,* Pacific Star Communications, Jul. 15, 2000.

* cited by examiner

SYSTEM AND METHOD FOR SERVICE DEVELOPMENT OVER CONTENT-SPECIFIC SESSIONS

BACKGROUND OF THE INVENTION

1. Technical Field

The present invention relates in general to a system and method for deploying services over a content-specific session. In particular, the present invention relates to a system and method for dynamically providing a user with a resource-oriented login over a PPPoE connection that includes attributes that allows the user to better utilize the resource.

2. Description of the Related Art

Computer systems in general and International Business Machines (IBM) compatible personal computer systems in particular have attained widespread use for providing computer power to many segments of today's modern society. A personal computer system can usually be defined as a desk top, floor standing, or portable microcomputer that includes a system unit having a system processor and associated volatile and non-volatile memory, a display monitor, a keyboard, one or more diskette drives, a fixed disk storage device and an optional printer.

One of the distinguishing characteristics of these systems is the use of a system board to electrically connect these components together. These personal computer systems are information handling systems which are designed primarily to give independent computing power to a single user (or a relatively small group of users in the case of personal computers which serve as computer server systems) and are inexpensively priced for purchase by individuals or small businesses. A personal computer system may also include one or a plurality of I/O devices (i.e. peripheral devices) which are coupled to the system processor and which perform specialized functions. Examples of I/O devices include modems, sound and video devices or specialized communication devices. Nonvolatile storage devices such as hard disks, CD-ROM drives and magneto-optical drives are also considered to be peripheral devices.

Computers are often linked to one another using a network, such as a local area network (LAN), wide area network (WAN), or other types of networks such as the Internet. By linking computers, one computer can use resources owned by another computer system. These resources can include files stored on nonvolatile storage devices and resources such as printers. An application program called a "browser" is used to view pages of information received from servers on a large computer network, such as the Internet.

The Internet is a global network connecting millions of computers. Unlike online services, which are centrally controlled, the Internet is decentralized by design. Each Internet computer, called a host, is independent. Its operators can choose which Internet services to use and which local services to make available to the global Internet community.

There are a variety of ways to access the Internet. Many Internet users gain access through a commercial Internet Service Provider (ISP). ISPs generally provide Internet access through a modem and PPP connection Increasingly, ISPs are providing "broadband" connections to the Internet, such as cable modems or DSL, in addition to wireless connections connectivity. ISPs may provide additional services, such as leased lines (T-1 or T-3) and Web development. Online services, such as "portals" and other types of Web sites provide their own proprietary content in addition to Internet access.

DSL refers collectively to all types of digital subscriber lines, the two main categories being ADSL and SDSL. DSL is growing in popularity as more areas around the world gain network (i.e., Internet) access. Two other types of DSL technologies are High-data-rate DSL (HDSL) and Very high DSL (VDSL). DSL technologies use sophisticated modulation schemes to pack data onto copper wires. They are sometimes referred to as "last-mile" technologies because they are used only for connections from a telephone switching station to a home or office, not between switching stations.

DSL is similar to ISDN inasmuch as both operate over existing copper telephone lines (POTS) and both typically require short runs to a central telephone office (usually less than 20,000 feet). However, DSL offers much higher speeds—up to 32 Mbps for downstream traffic, and from 32 Kbps to over 1 Mbps for upstream traffic.

ADSL is short for Asymmetric Digital Subscriber Line, a technology that allows more data to be sent over existing copper telephone lines (POTS). ADSL currently supports data rates of from 1.5 to 9 Mbps when receiving data (known as the downstream rate) and from 16 to 640 Kbps when sending data (known as the upstream rate).

SDSL is short for Symmetric Digital Subscriber Line, a technology that also allows more data to be sent over existing copper telephone lines. SDSL supports data rates up to 3 Mbps. SDSL works by sending digital pulses in the high-frequency area of telephone wires. Since these high frequencies are not used by normal voice communications, SDSL can operate simultaneously with voice connections over the same wires. Both ADSL and SDSL require a special modem. SDSL is called symmetric because it supports the same data rates for upstream and downstream traffic. Conversely, ADSL is call asymmetric because it does not support the same data rates for upstream and downstream traffic.

PPPoE is short for Point-to-Point Protocol over Ethernet. PPPoE relies on two widely accepted standards: PPP and Ethernet. PPPoE is a specification for connecting the users on an Ethernet to the Internet through a common broadband medium, such as a single DSL line, wireless device or cable modem. All the users over the Ethernet share a common connection, so the Ethernet principles supporting multiple users in a LAN combine with the principles of PPP, which apply to serial connections.

PPP (short for Point-to-Point Protocol), is a method of connecting a computer to the Internet. PPP is more stable than the older SLIP protocol and provides error checking features. Working in the data link layer of the OSI model, PPP sends the computer's TCP/IP packets to a server that puts them onto the Internet.

Ethernet is a local-area network (LAN) architecture developed by Xerox Corporation in cooperation with DEC and Intel in 1976. Ethernet uses a bus or star topology and supports data transfer rates of 10 Mbps. The Ethernet specification served as the basis for the IEEE 802.3 standard, which specifies the physical and lower software layers. Ethernet uses the CSMA/CD access method to handle simultaneous demands. Ethernet is one of the most widely implemented LAN standards.

With some Point-to-Point Protocol implementations, such as a DSL implementation, it is possible for the ISP to configure users' access individually. In this manner, one user can receive different attributes, such as bandwidth, than another user even though both users are using the same ISP.

One user can therefore pay more money in order to have more bandwidth between their computer system and the ISP.

A challenge with having different bandwidths for different users is that a user with more bandwidth often times does not need the larger bandwidth he or she is receiving in order to perform network operations, such as visiting Web sites. Likewise, a user with less bandwidth may encounter times, such as when downloading and playing multimedia content, for which additional bandwidth would be helpful to avoid slow or choppy delivery.

What is needed, therefore, is a system and method that provides additional attributes, such as bandwidth, to a user based upon the resource requested by the user. In particular, what is needed is a system and method that provides the user with a dynamically created service login in response to a resource request, wherein the service login includes attributes corresponding to the desired resource.

SUMMARY

It has been discovered that the aforementioned challenges are resolved using a system and method that provides users with session attributes based upon the resource requested by the user. In particular, the system and method creates a service level login, or user identifier, that includes attributes corresponding to the requested resource.

The client uses an application, such as Internet browser application software, to request a resource from a service provider (e.g., an ISP). The service provider processes the client's order. This processing may include billing the client for the resource, such as a pay-per-view movie that is streamed from the service provider to the client. The service provider provisions the order and creates an order identifier corresponding to the order. In addition, a resource manager process identifies attributes associated with the selected resource.

Resources include both non-client specific resources, such as a pay-per-view movie and downloadable audio content, as well as client-specific resources, such as network accessible storage. With client-specific resources, the resource manager configures the resource and creates a unique resource identifier for the resource. For example, if a client requests 10 MB of network accessible storage, the resource manager would configure the 10 MB of storage, record the storage location's address, and assign a resource identifier to the newly created network accessible storage.

The client receives a resource identifier corresponding to the resource (i.e., a resource URL) as well as a "service" login identifier that is not the same as the client's regular user identifier that the client normally uses to log onto the ISP. The client uses the service login identifier and the client's normal password (i.e., the password that corresponds to the client's regular user identifier) to request the resource URL. In one embodiment, the service login identifier includes identifiers corresponding to the requested resource and/or the order that was placed by the user.

The service providers authentication process receives the service login identifier and password from the client along with the client's request for the resource URL. The authentication process retrieves the client's regular user identifier by looking up the order placed by the client and checks it using the password provided by the client. In one embodiment, the order is retrieved by parsing the order identifier from the service login identifier and retrieving the corresponding order from an order data store. The authentication process also sets up the client's service login session according to the attributes specified by the resource. For example, if the resource is a streaming multimedia presentation the bandwidth attribute may be set to 8 Mbps, while a less intensive resource, such as digital music, may have a bandwidth attribute of 2 Mbps.

The resource URL is used to direct the client to the requested resource. In the case of a non-client specific resource, such as a movie or digital music, several clients can share the same resource URL. However, in the case of client-specific resource, such as network accessible storage, the client uses a unique resource URL that directs the client to the particular resource that was setup for the client's use. In one embodiment, when the client is finished using the resource, the service login is terminated and the client accesses the network through the service provider using the client's regular user identifier and password.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
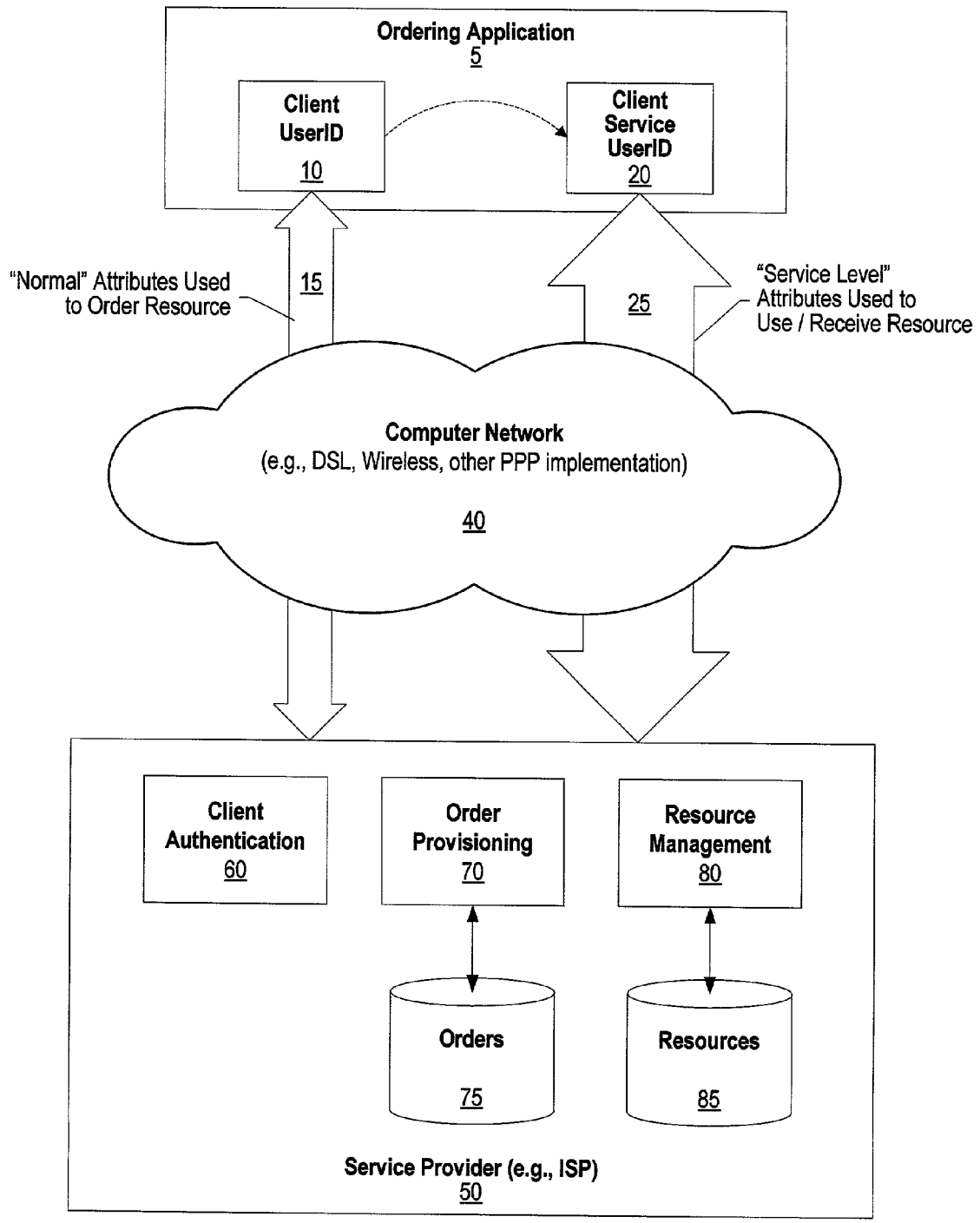
FIG. 1 is a high level system diagram for deploying resources over a content specific session.

FIG. 1 is a high level system diagram for deploying resources over a content specific session. Ordering application 5, such as a web browser (e.g., Microsoft Internet Explorer™, Netscape Navigator™, etc.) is used by a user accessing computer network 40 using a client computing device, such as a personal computer, a personal digital assistant (PDA) or mobile telephone with a wireless network connection, or other type of computing device. Computer network 40 includes DSL, wireless, or other point-to-point protocol (PPP) enabled network using traditional copper telephone wires (POTS) or other type of medium to connect client's ordering application 5 with service provider 50.

Service provider 50 includes Internet Service Providers (ISP) or other type of service provider, such as a private company network, that is accessible by client's ordering application through computer network 40. Client's ordering application initially uses client's regular userid 10 to access service provider 50 using "normal" transmission path 15. Normal transmission path 15 is configured using standard attributes, such as bandwidth, that are assigned to the client.

Service provider 50 includes client authentication process 60 for authenticating the client's userid and password. Initially, the client's regular userid and password are authenticated by process 60. Subsequently, client selects and orders a resource that he wishes to receive or use. Service provider 50 also includes order provisioning process 70 which is used to provision the client's resource request and store order details in orders data store 75.

The client receives client service userid 20 wish is used to access the requested resource. In one embodiment, the client service userid is dynamically created by the service provider and corresponds with the requested resource. Order application switches from using client's regular userid 10 to using client's service userid 20. The client's service userid is configured with attributes, such as bandwidth, that correspond with the requested resource. In this manner, transmission path 25 uses such service level attributes to receive and use the requested resource. Consequently, transmission path 25 may have different attributes from "normal" transmission path 15 in order to provide the client with attributes, such as increased bandwidth, needed to properly utilize the requested resource.

Service provider 50 includes resource manager process 80 for managing resources requested by the client's ordering application. The resource manager process retrieves attributes corresponding to the requested resource from resources data store 85.

When the client uses service userid 20 to receive and use the requested resource, the service provider receives the service userid and the client's password. The client's password is used for both the regular client userid as well as the service userid. In one embodiment, the service userid includes the order identifier and/or the resource identifier corresponding to the clients order and/or requested resource. In this embodiment, the service provider parses the order identifier and/or resource identifier from the service userid and retrieves the client's normal userid in orders data store 75. The password is then authenticated using the retrieved normal userid. In one embodiment, the attributes of client's service level transmission path 25 also includes a resource URL that was provided to the client by the service provider. The resource URL is used to direct the client, using transmission path 25, to the requested resource.

Figure 2:
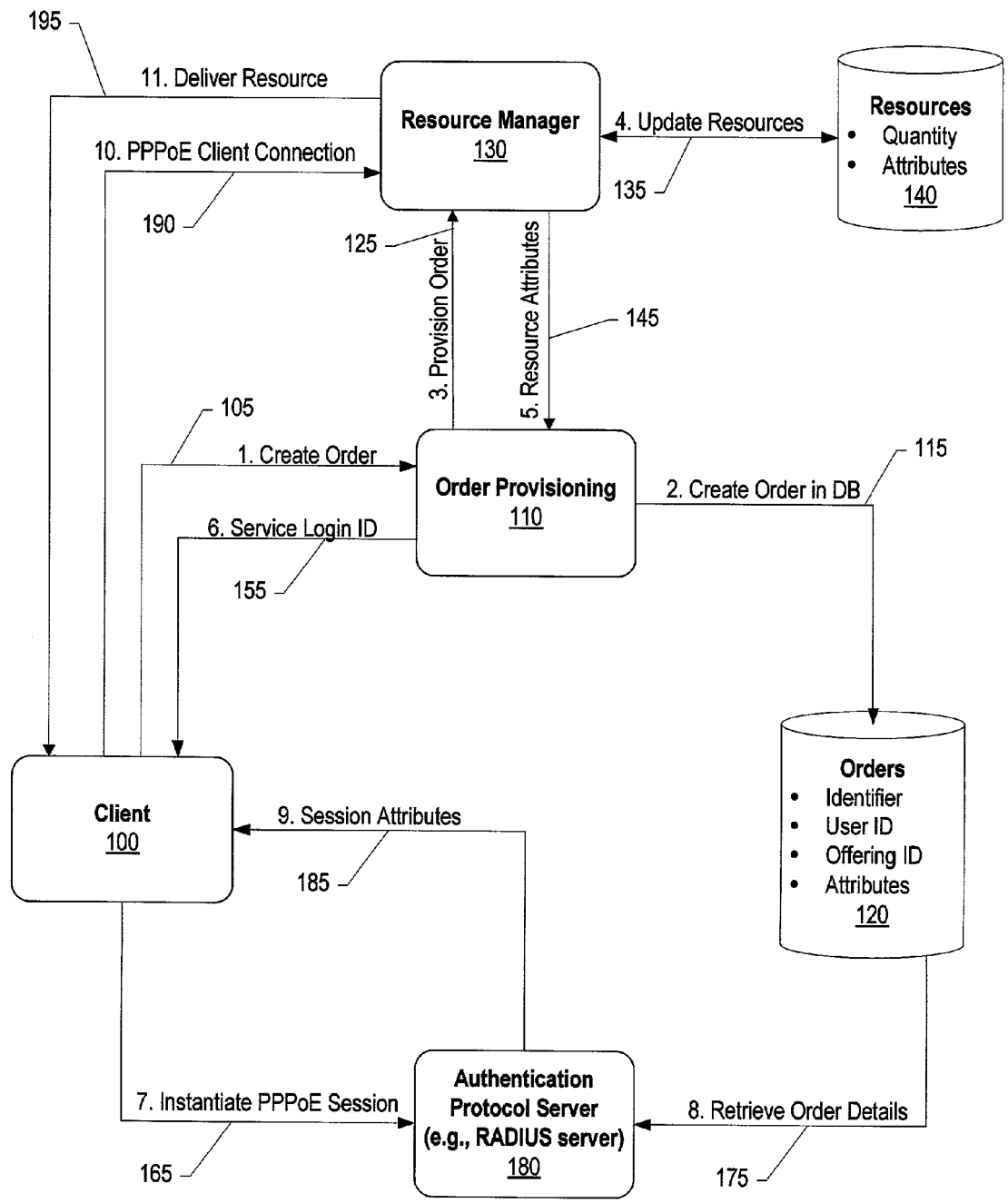
FIG. 2 is a dataflow diagram for deploying a resource over a content specific session.

FIG. 2 shows a dataflow diagram for deploying a resource over a content specific session. Client 100 uses an ordering application to order one or more resources that will be provided over a content-specific session. Client 100 may use a web browser, such as Microsoft Internet Explorer™ or Netscape Navigator™, accessing a web site that provides the user with information about various resources. Client 100 may also use a specialized application adapted to request and receive resources from a particular type of network application.

Resources include items such as pay-per-view movies that are available for downloading and playing on the user's computing device. Resources may also include client-specific resources, such as network accessible storage that is configured for the client and to which the client can store or backup data from the client's computer system.

Create order flow 105 is transmitted from client 100 to order provisioning application when the client orders a resource. Create order flow 105 includes information about the resource ordered. For example, if a particular movie is ordered, create order flow 105 might include an identifier corresponding to the selected movie, the movie name, the price of the movie, or other order information. If the resource is client-specific, such as ordering network accessible storage that will be configured and provided to the user for storing data, the create order flow might include the amount of disk space requested by the user and other attributes about the disk space. In addition, create order flow 105 may also include payment information, such as credit card information, for paying for the resource and the content-specific session through which the resource is provided.

Create order in database flow 115 is transmitted from order provisioning process 110 and stored in orders data store 120. The orders data store includes an order identifier that was created by the order provisioning process, the client's userid, and an identifier corresponding to the client's selected offering. Provision order data flow 125 is transmitted from order provisioning process 110 to resource manager process 130 in order to set up the requested resource.

Resource manager process 140 determines whether the requested resource is available and identifiers attributes, such as bandwidth and other Quality of Service (QoS) attributes needed to provide the resource to the client. In addition, if the resource is a client-specific resource, such as network accessible storage that the client will use to store data, the resource manager process sets up the resource and assigns a unique resource identifier to the resource. The resource manager process creates a unique service login identifier (i.e., a service userid or login name) that is assigned the attributes, such as bandwidth, identified for the selected resource. The service login will be used by the client to use or receive the resource. The resource manager process also determines a resource Uniform Resource Locator (resource URL) that will be used by the client. The resource URL will be returned to the client and addresses the resource, such as the network address of a movie the client has requested or the network address of network accessible storage that the client will use to store files.

Update resources data flow 135 is transmitted between resource manager process 130 and resources data store 140. Resources data store 140 includes a quantity, if applicable, of resources that can be requested by clients as well as attributes, such as bandwidth, used to provide the corresponding resources. For example, if the resource is network storage, the quantity would include the amount of available storage as well as the amount of storage space requested by the client. Attributes, such as bandwidth, can vary from one resource to another. For example, an audio stream, such as digital music, would likely require less bandwidth than an audio visual stream, such as a movie that is downloaded and played on the client's computing device.

Resource manager process 130 returns the resource attributes corresponding to the requested resource back to order provisioning process 110 in data flow 145. The resource attributes may include attributes regarding quality of service (QoS), such as bandwidth. In addition, if the resource is a client-specific resource, such as network accessible storage, the attributes from the resource manager include the unique resource URL corresponding to the client-specific resource.

Order provisioning process 110 returns service login identifier (i.e., the service user ID) to client 100 in data flow 155. In one embodiment, data flow 155 also includes the resource URL that the client will use to request the resource.

Client 100 uses the received service login identifier to request a new point-to-point session between the client and the service provider by sending the received service login ID and the client's normal password to service provider's authentication process 180 (data flow 165). In a manual embodiment, the user of the client is prompted to create a new session with the service provider using the service login identifier and the client's normal password. Authentication process 180, such as a RADIUS server, retrieves order details corresponding to the client's order from orders data store 120 (data flow 175).

RADIUS is short for "Remote Authentication Dial-In User Service," which is an authentication and accounting system used by many Internet Service Providers (ISPs). When a user connect to the ISP he or she enters the username and password. This information is passed to a RADIUS server, which checks that the information is correct, and then authorizes access to the ISP system. As will be appreciated by those skilled in the art, an access server, such as a Network Access Server in a dial up environment or an Access Concentrator in a DSL environment, actually receives the client's request and passes the login identifier and password to the RADIUS server for authentication.

In one embodiment, the client's service login ID includes order and/or resource identifiers that are used to retrieve the client's order. The client's order details include the client's normal user ID which is used in conjunction with the clients password (provided in data flow 165) to authenticate the service login ID. If authenticated, the authentication process returns session attributes corresponding to the service login ID's session to the client in data flow 185.

Client 100 uses the received session attributes, including the resource URL, to establish a PPPoE connection to service provider's resource manager process 130 (data flow 190). Resource manager authenticates the client's request for the resource by matching the resource identifier and/or the order identifier with the client's service login ID. If the client is authenticated, resource manager process 130 delivers the requested resource to the client using the service login session (data flow 195).

Figure 3:
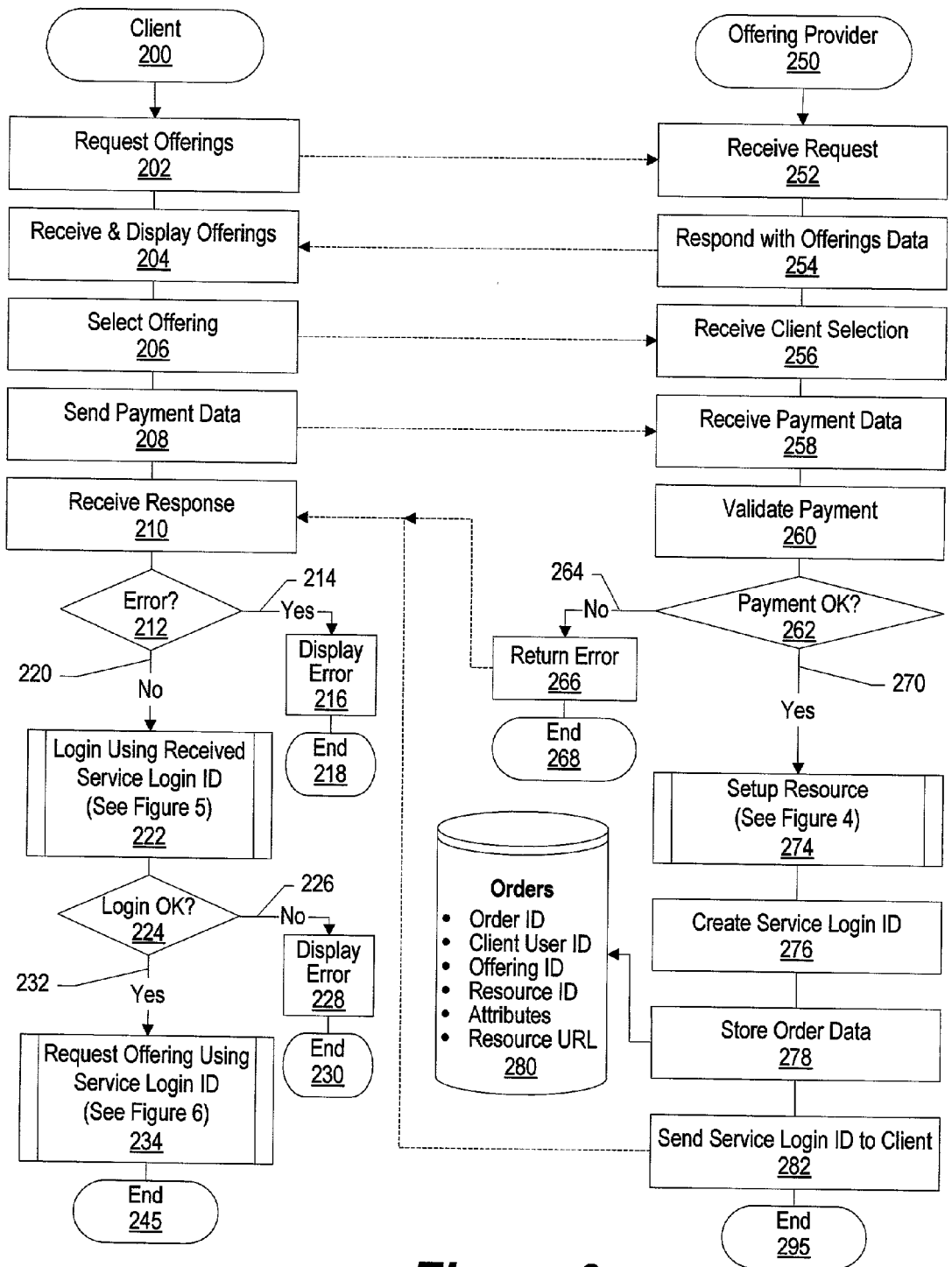
FIG. 3 is a flowchart showing steps taken by and interaction between the client ordering application and the offering provider.

FIG. 3 is a flowchart showing steps taken by and interaction between the client ordering application and the offering provider. Client processing commences at 200 whereupon the client requests one or more offerings available from the service provider (step 202). The offering provider's, such as an ISP's, processing commences at 250 whereupon the client's request is received (step 252). The offering provider retrieves information about the requested resources, such as the descriptions, prices, and availability, and returns the offerings information to the client (step 254). The client receives the offerings information and displays the information to the user (step 204). The user views the offerings and makes a selection (step 206). The user also sends payment information, such as credit card information, or authorizes the service provider to include charges for the selected resource on the user's next bill. The offering provider receives the client's selection (step 256) and the payment data (step 258).

The offering provider validates the payment (step 260). Validating may include verifying supplied credit card information or determining whether the client's account is in good standing so that the price of the resource can be added to the client's next bill. A determination is made as to whether the payment is approved (decision 262). If the payment is not approved, decision 262 branches to "no" branch 264 whereupon an error is returned to the client (step 266) and offering provider's processing of the client's request ends at 268.

Figure 4:
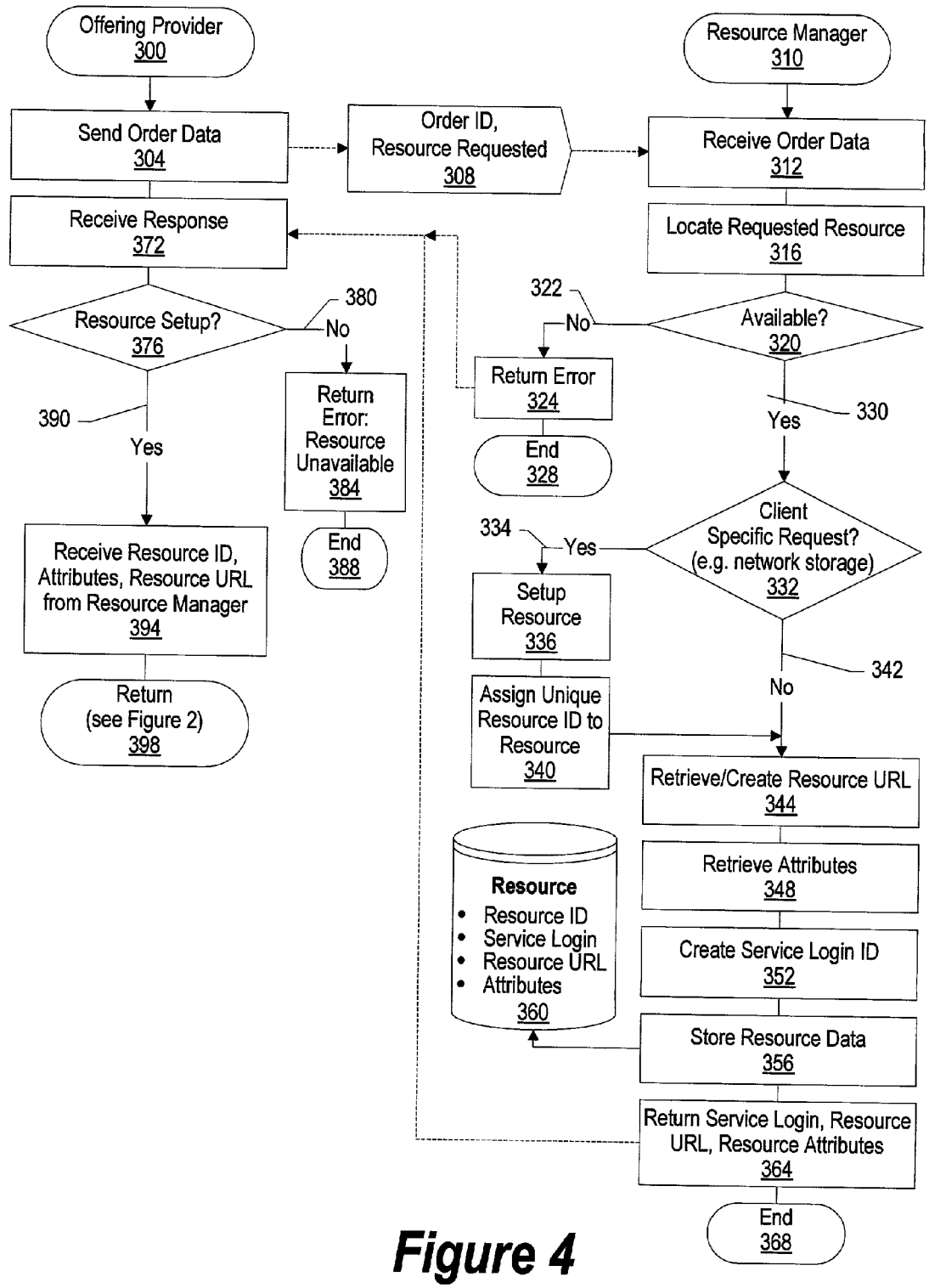
FIG. 4 is a flowchart showing steps taken by and interaction between the offering provider and the application managing the requested resource.

On the other hand, if the client's payment is validated, decision 262 branches to "yes" branch 270 whereupon the requested resource is setup by the resource manager (predefined process 274, see FIG. 4 for processing details). The resource manager returns the resource identifier if the resource is a client-specific resource, such as network accessible storage. In addition, the resource manager returns the resource URL that will be used by the client to access the resource and returns resource attributes, such as needed bandwidth, corresponding to the user. The attributes will be used to configure a client session to receive and use the resource.

The offering provider creates a service login ID (step 276). In one embodiment, the service login ID includes data indicating the order number and/or the resource identifier (e.g., order678@res12345). The order data is stored in orders data store 280 (step 278). Order data includes the order identifier, the client's normal user id (i.e., not the service login id), the offering id, the resource id, attributes corresponding to the resource (i.e., bandwidth to provide the user when using the resource), and the resource URL. An example of a resource URL may be http://resmgr.ibm.com/movies?resID=12345. Note how the resource ID in the URL corresponds to the example resource ID in the service login ID shown above. The service login ID is returned to the client (step 282) and offering provider processing ends at 295.

Returning to client processing, the client receives a response from the offering provider (step 210). The response is either a service login ID or an error indicating that the request did not complete properly. A determination is made as to whether the response is an error (decision 212). If the response is an error, decision 212 branches to "yes" branch 214 whereupon the error is displayed to the user (step 216) and processing ends at 218.

Figure 5:
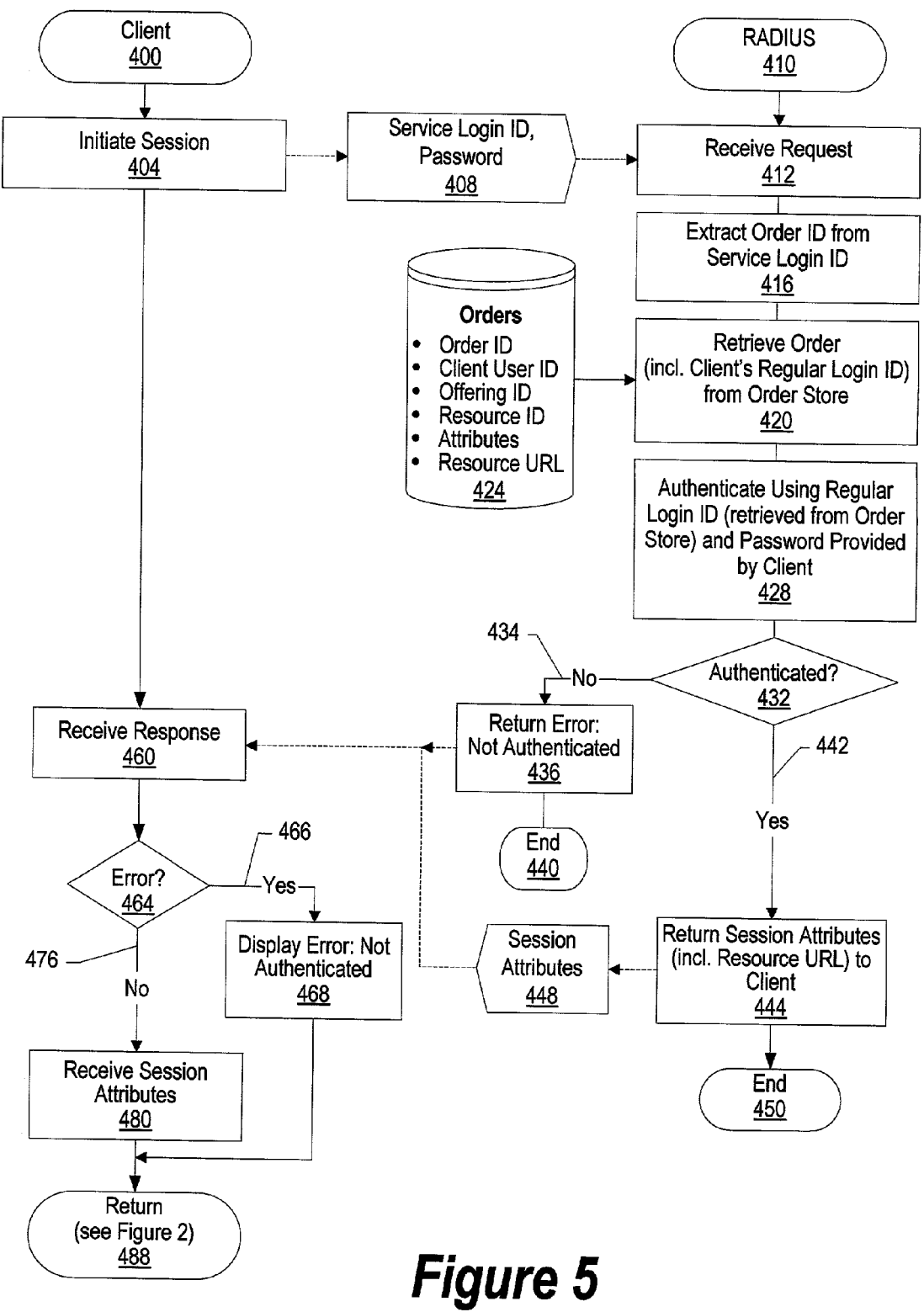
FIG. 5 is a flowchart showing steps taken by and interaction between the client ordering application and the authentication server.

On the other hand, if the response is not an error, decision 212 branches to "no" branch 220 whereupon the client logs into the service provider using the service login that was received from the offering provider (predefined process 222, see FIG. 5 for processing details). In a manual process, the user of the client computer is prompted to login to the service provider using the service login identifier. The user uses a client application, such as a PPPoE client or a dial-up client, to enter the service login identifier and the user's password. This information is transmitted to an access server (e.g., a Network Access Server (NAS), an Access Concentrator, etc), which in turn passes the identifier and password onto the RADIUS server for authentication (see FIG. 5 for processing details).

A determination is made as to whether the client was able to successfully log in using the service login ID (decision 224). If the login was not successful, decision 224 branches to "no" branch 226 whereupon an error is displayed (step 228) and client processing ends at 230.

Figure 6:
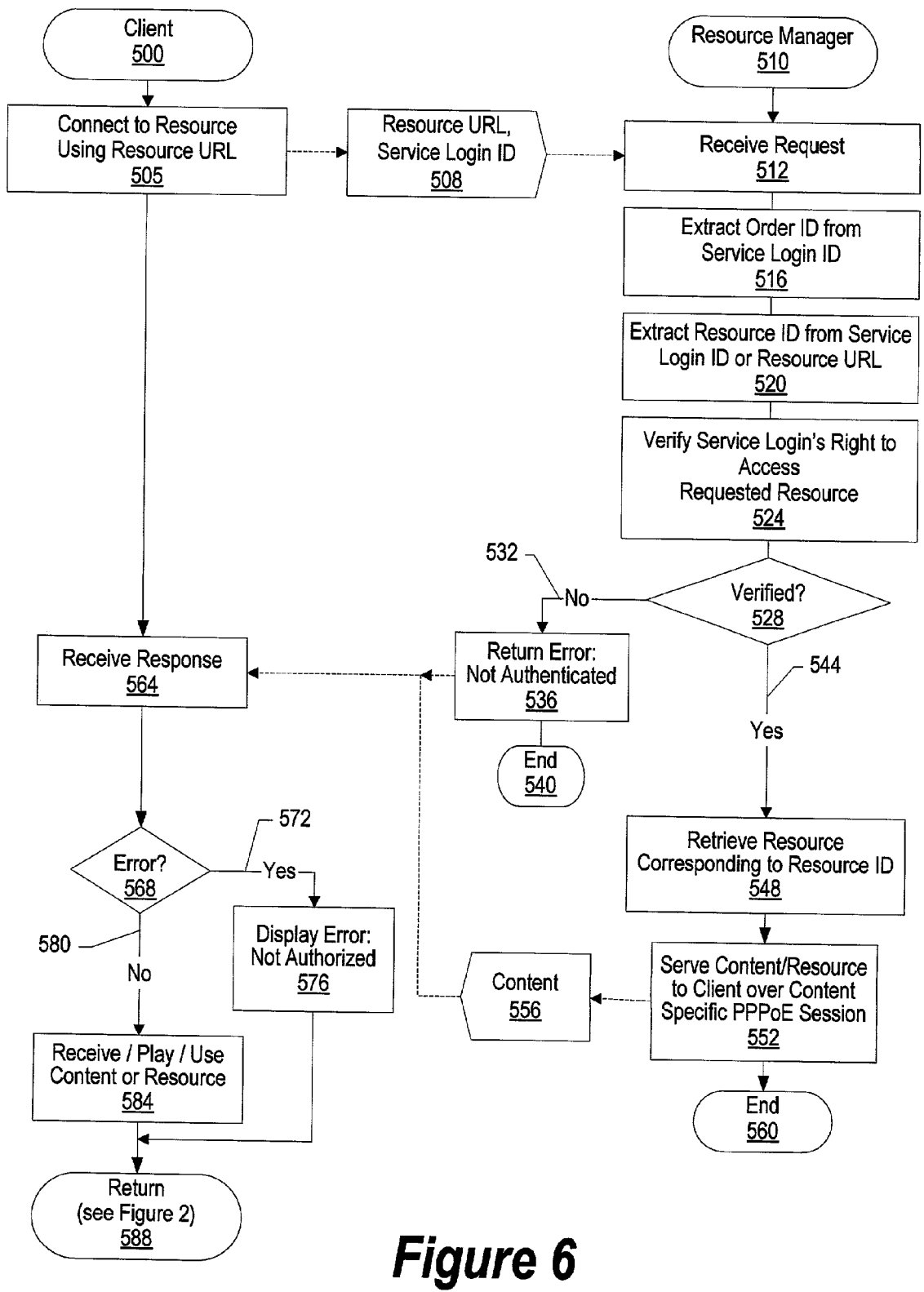
FIG. 6 is a flowchart showing steps taken by and interaction between the client ordering application and the application managing the requested resource.

On the other hand, if the login was successful, decision 224 branches to "yes" branch 232 whereupon the client requests the resource offering using the session established for the service login identifier with session attributes appropriate for receiving/using the resource (predefined process 234, see FIG. 6 for processing details). Client processing thereafter ends at 245.

FIG. 4 is a flowchart showing steps taken by and interaction between the offering provider and the application managing the requested resource. After the offering provider receives a resource request from a client, it contacts the resource manager to provision the resource.

Offering provider processing commences at 300 whereupon the offering provider sends order data (step 304) to the resource manager in message 308. Order data includes the order ID created by the offering provider and information about the resource being requested by the client.

Resource manager processing commences at 310 whereupon the resource manager receives the order data from the offering provider (step 312). The resource manager locates the requested resource, such as a movie or a network accessible storage area (step 316). A determination is made as to whether the requested resource is available (decision 320). If the resource is not available, decision 320 branches to "no" branch 322 whereupon an error is returned to the offering provider (step 324) and resource manager processing ends at 328.

On the other hand, if the resource is available, decision 320 branches to "yes" branch 330 whereupon a determination is made as to whether the request is for a client-specific resource (e.g., network accessible storage to which the client will store data) or non-client specific storage (decision 332). If the request is for a client-specific resource, decision 332 branches to "yes" branch 334 whereupon the client specific resource is setup (step 336, e.g., the network accessible storage is configured and formatted according the client's size request), and a unique identifier is assigned to the client-specific resources (step 340). On the other hand, if the request is not for a client-specific resource, decision 332 branches to "no" branch 342 bypassing the steps used to process client-specific resource requests.

A resource URL is retrieved or created (step 344). If the resource is a client-specific resource, the resource URL is created using the unique resource identifier assigned in step 340, otherwise the resource URL is retrieved that corresponds to the non-client specific resource (i.e., the resource URL for the network location of the requested movie). Attributes, such as bandwidth and other Quality-of-Service (QoS) attributes, are retrieved that correspond to the resource (step 348). A service login identifier is created (step 352). In one embodiment, the service login identifier includes information about both the order identifier and the resource identifier (e.g., order678@res12345 where 678 is the order ID and 12345 is the resource ID). The resource data is stored in resource data store 360 (step 356). The resource data includes the resource ID, the service login ID, the resource URL, and the attributes corresponding to the resource. The service login id, resource URL, and resource attributes are returned to the offering provider (step 364) and resource manager processing ends at 368.

Returning to offering provider processing, the offering provider receives a response from the resource manager (step 372). The offering provider determines, based upon the response, whether the resource was setup (decision 376). If the resource was not setup, decision 376 branches to "no" branch 380 whereupon an error is returned to the client (step 384, i.e., the requested resource is unavailable) and order provider processing ends at 388.

On the other hand, if the resource was successfully setup, decision 376 branches to "yes" branch 390 whereupon the offering provider receives data, such as the resource ID, attributes, and the resource URL, from the resource manager (step 394) and processing returns at 398 (see FIG. 2 for subsequent processing).

FIG. 5 is a flowchart showing steps taken by and interaction between the client ordering application and the authentication server. The client, having requested a resource and received a service login ID in response to the request, is using the request to access the service provider (i.e., the ISP). If the service login ID is authenticated, the result of authenticating the service login ID will be a session created with the attributes, such as bandwidth, that correspond to the resource.

Client processing commences at 400 whereupon the client initiates a session with the service provider's authentication process (step 404) by sending the service login ID and the client's regular password to the authentication process (message 408). As will be appreciated by those skilled in the art, an access server, such as a Network Access Server in a dial up environment or an Access Concentrator in a DSL environment, actually receives message 408 and passes the login identifier and password to the RADIUS server for authentication.

RADIUS ("Remote Authentication Dial-In User Service") processing commences at 410 whereupon the client's session request is received (i.e., from the access server). In embodiments that include the order identifier in the service login ID, the order identifier is extracted from the service login ID (Step 416). The order, created by the order provider process, is retrieved (step 420) from orders data store 424. The orders data store record includes the client's regular user identifier. The password provided by the client is authenticated with the client's regular user id (step 428, i.e., simulating the client entering his regular user id and password).

A determination is made as to whether the password is authentic (decision 432). If the password is not authentic, or valid, decision 432 branches to "no" branch 434 whereupon an error is returned to the client (step 436, i.e., incorrect password) and authentication processing ends at 440. On the other hand, if the password is valid, decision 432 branches to "yes" branch 442 whereupon the authentication server passes the session attributes, including the resource URL, back to the client (step 444) and authentication processing ends at 450.

Returning to client processing, the client receives a response from the authentication process (step 460). The response is either an error or session attributes message 448. A determination is made as to whether the received response is an error (decision 464). If the response is an error, decision 464 branches to "yes" branch 466 whereupon an error is displayed to the user (step 468, i.e., "invalid password"). On the other hand, if the response is not an error, decision 464 branches to "no" branch 476 whereupon the session attributes corresponding to the service login ID's session with the service provider are received (step 480). Client processing thereafter returns at 488 (see FIG. 2 for subsequent processing).

FIG. 6 is a flowchart showing steps taken by and interaction between the client ordering application and the application managing the requested resource. This processing is performed when the client's service login ID has been authenticated and the client is using the service login ID to access and receive the requested resource from the resource manager.

Client processing commences at 500 whereupon the client connects to the resource using the resource URL received from the service provider (step 505). Resource manager processing commences at 510 whereupon the resource manager receives the clients request (step 512) included in message 508 (i.e., the client's service login ID and the resource URL). In one embodiment, the resource manager extracts the order ID from the service login ID (step 516, e.g., order678@res12345). The resource identifier is retrieved from either the resource URL, the service login ID, or retrieved from a table (step 520, the resource ID can be included in the service login ID (e.g., order678@res12345), the resource URL may also include the resource. ID (e.g., http://resmgr.ibm.com/movies?resID=12345). The resource manager verifies that the service login identifier is authorized to access/receive the requested resource (step 524).

A determination is made as to whether the service login identifier is authorized to access/receive the resource (decision 528). If the service login ID is not authorized, decision 528 branches to "no" branch 532 whereupon an error is returned to the client (step 536) and resource manager processing ends at 540. On the other hand, if the service login ID is authorized to receive the resource, decision 528 branches to "yes" branch 544 whereupon the resource manager retrieves the resource corresponding to the resource ID (step 548, i.e., a movie, network accessible storage, etc.). The retrieved resource 556 is served/provided (content stream 556) to the client over the content specific PPPoE session that has been established using attributes corresponding to the resource (step 552). Resource manager processing thereafter ends at 560 after the resource has been served to the client.

Returning to client processing, the client receives a response from the resource manager (step 564). A determination is made as to whether the response is an error (decision 568). If the response is an error, decision 568 branches to "yes" branch 572 whereupon an error message is displayed to the user (step 576, e.g., "Not Authorized to Receive Resource"). On the other hand, if the response is not an error, decision 568 branches to "no" branch 580 whereupon the client receives the requested resource (step 584) and either plays the resource (in the case of content such as a movie) or uses the resource (in the case of network accessible storage). Client processing returns to the calling procedure at 588 (see FIG. 2 for subsequent processing details).

Figure 7:
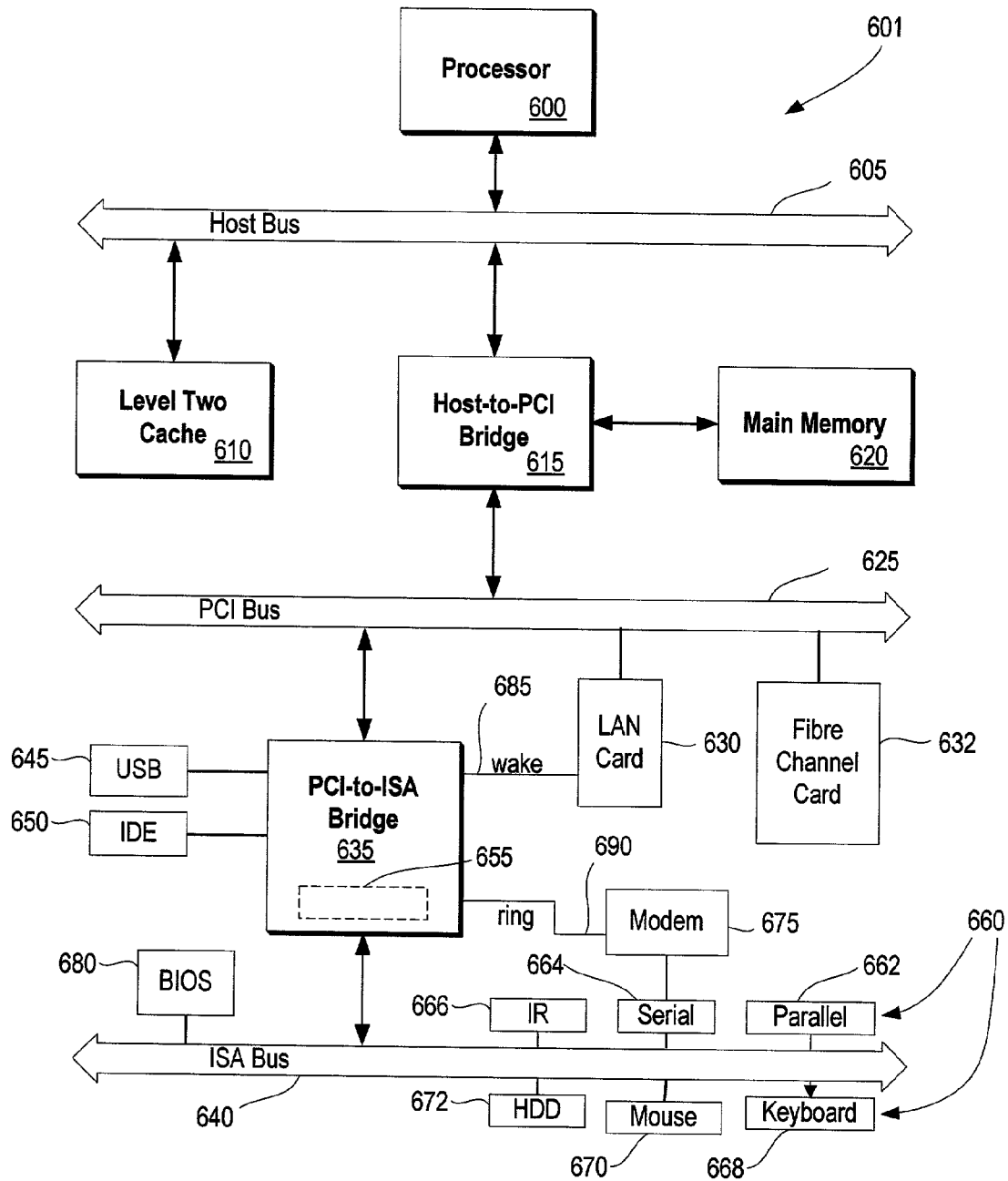
FIG. 7 is a block diagram of an information handling system capable of implementing the present invention.

FIG. 7 illustrates information handling system 601 which is a simplified example of a computer system capable of performing the operations described herein. Computer system 601 includes processor 600 which is coupled to host bus 605. A level two (L2) cache memory 610 is also coupled to the host bus 605. Host-to-PCI bridge 615 is coupled to main memory 620, includes cache memory and main memory control functions, and provides bus control to handle transfers among PCI bus 625, processor 600, L2 cache 610, main memory 620, and host bus 605. PCI bus 625 provides an interface for a variety of devices including, for example, LAN card 630. PCI-to-ISA bridge 635 provides bus control to handle transfers between PCI bus 625 and ISA bus 640, universal serial bus (USB) functionality 645, IDE device functionality 650, power management functionality 655, and can include other functional elements not shown, such as a real-time clock (RTC), DMA control, interrupt support, and system management bus support. Peripheral devices and input/output (I/O) devices can be attached to various interfaces 660 (e.g., parallel interface 662, serial interface 664, infrared (IR) interface 666, keyboard interface 668, mouse interface 670, fixed disk (HDD) 672 coupled to ISA bus 640. Alternatively, many I/O devices can be accommodated by a super I/O controller (not shown) attached to ISA bus 640.

BIOS 680 is coupled to ISA bus 640, and incorporates the necessary processor executable code for a variety of low-level system functions and system boot functions. BIOS 680 can be stored in any computer readable medium, including magnetic storage media, optical storage media, flash memory, random access memory, read only memory, and communications media conveying signals encoding the instructions (e.g., signals from a network). In order to attach computer system 601 to another computer system to copy files over a network, LAN card 630 is coupled to PCI bus 625 and to PCI-to-ISA bridge 635. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for providing a resource to a client connecting to a service provider, said method comprising:

receiving a resource request from the client over a first session;

creating a service login identifier in response to the resource request;

in response to the creating, storing one or more session attributes corresponding to the service login identifier, wherein the session attributes include a resource URL corresponding to the location of the requested resource;

returning the service login identifier to the client over the first session;

receiving a session request from the client, wherein the session request includes the service login identifier and a password;

establishing a second session between the service provider and the client in response to the session request;

providing the resource URL to the client over the second session;

receiving a connection request from the client, the connection request including the service login identifier and the resource URL;

establishing a connection with the client based upon the resource URL; and using the connection to provide the requested resource to the client.

2. The method as described in claim 1 further comprising:

in response to receiving the connection request, retrieving the stored session attributes; and wherein the connection is a content-specific connection that has properties based upon at least one of the retrieved session attributes that are selected from the group consisting of a bandwidth amount, a session duration, and a packet size.

3. The method as described in claim 1 further comprising:

receiving an order from the client, the order corresponding to the requested resource;

identifying a price for the requested resource;

billing the price of the resource to an account corresponding to the client;

creating an order identifier for the order; and storing the order identifier and order details corresponding to the order in a data store.

4. The method as described in claim 1 further comprising:

identifying an order identifier corresponding to the client's resource request, wherein the service login identifier includes a component derived from the order identifier.

5. The method as described in claim 1 further comprising:

identifying a resource identifier corresponding to the requested resource, wherein the service login identifier includes a component derived from the resource identifier.

6. The method as described in claim 1 further comprising:

determining that the requested resource is a client-specific resource;

retrieving client-specific resource request data included in the resource request;

provisioning the client-specific resource based upon the client-specific resource request data; and assigning a resource identifier to the provisioned client-specific resource, wherein the resource URL is derived from the resource identifier.

7. The method as described in claim 1 further comprising:

identifying a normal login identifier corresponding to the client, the identifying including:

locating an order corresponding to the service login identifier;

retrieving the normal login identifier from the located order;

retrieving a stored password that corresponds to the normal login identifier; and authenticating the password by comparing the password to the stored password.

8. An information handling system comprising:

one or more processors;

a memory accessible by the processors;

a network interface connecting the information handling system to a client through a computer network; and a resource deployment tool for providing a resource to the client over a content-specific network session, the resource deployment tool including:

receiving logic for receiving a resource request from the client over a first session;

identifier generation logic for creating a service login identifier in response to the resource request;

storage logic for storing one or more session attributes corresponding to the service login identifier in response to creating the service login identifier, wherein the session attributes include a resource URL corresponding to the location of the requested resource;

transmission logic for returning the service login identifier to the client over the first session;

request handling logic for receiving a session request from the client, wherein the session request includes the service login identifier and a password;

session logic for establishing a second session between the service provider and the client in response to the session request;

the transmission logic for providing the resource URL to the client over the second session;

the session logic for receiving a connection request from the client, the connection request including the service login identifier and the resource URL;

connection logic for establishing a connection with the client based upon the resource URL; and deployment logic for providing the requested resource to the client over the connection.

9. The information handling system as described in claim 8 further comprising:

in response to receiving the connection request, retrieval logic for retrieving the stored session attributes; and wherein the connection is a content-specific connection that has properties based upon at least one of the retrieved session attributes that are selected from the group consisting of a bandwidth amount, a session duration, and a packet size.

10. The information handling system as described in claim 8 further comprising:

order receiving logic for receiving an order from the client, the order corresponding to the requested resource;

price identification logic for identifying a price for the requested resource;

invoice logic for billing the price of the resource to an account corresponding to the client;

order generation logic for creating an order identifier for the order; and storage logic for storing the order identifier and order details corresponding to the order in a data store.

11. The information handling system as described in claim 8 further comprising:

order identification logic for identifying an order identifier corresponding to the client's resource request, wherein the service login identifier includes a component derived from the order identifier.

12. The information handling system as described in claim 8 further comprising:
resource identification logic for identifying a resource identifier corresponding to the requested resource, wherein the service login identifier includes a component derived from the resource identifier.

13. The information handling system as described in claim 8 further comprising:
determination logic for determining that the requested resource is a client-specific resource;
retrieval logic for retrieving client-specific resource request data included in the resource request;
provisioning logic for provisioning the client-specific resource based upon the client-specific resource request data; and
assignment logic for assigning a resource identifier to the provisioned client-specific resource, wherein the resource URL is derived from the resource identifier.

14. The information handling system as described in claim 8 further comprising:
identification logic for identifying a normal login identifier corresponding to the client, the identification logic including:
search logic for locating an order corresponding to the service login identifier;
retrieval logic for retrieving the normal login identifier from the located order;
retrieval logic for retrieving a stored password that corresponds to the normal login identifier; and
authentication logic for authenticating the password by comparing the password to the stored password.

15. A computer program product stored in a computer operable media, the computer operable media containing instructions for execution by a computer, which, when executed by the computer, cause the computer to implement a method for providing a resource to a client connecting to a service provider, the method comprising:
receiving a resource request from the client over a first session;
creating a service login identifier in response to the resource request;
in response to the creating, storing one or more session attributes corresponding to the service login identifier, wherein the session attributes include a resource URL corresponding to the location of the requested resource;
returning the service login identifier to the client over the first session;
receiving a session request from the client, wherein the session request includes the service login identifier and a password;
establishing a second session between the service provider and the client in response to the session request;
providing the resource URL to the client over the second session;
receiving a connection request from the client, the connection request including the service login identifier and the resource URL;
establishing a connection with the client based upon the resource URL; and
using the connection to provide the requested resource to the client.

16. The computer program product as described in claim 15 further comprising:
in response to receiving the connection request, retrieving the stored session attributes; and
wherein the connection is a content-specific connection that has properties based upon at least one of the retrieved session attributes that are selected from the group consisting of a bandwidth amount, a session duration, and a packet size.

17. The computer program product as described in claim 15 wherein the method further comprises:
receiving an order from the client, the order corresponding to the requested resource;
identifying a price for the requested resource;
billing the price of the resource to an account corresponding to the client;
creating an order identifier for the order; and
storing the order identifier and order details corresponding to the order in a data store.

18. The computer program product as described in claim 15 wherein the method further comprises:
identifying an order identifier corresponding to the client's resource request, wherein the service login identifier includes a component derived from the order identifier.

19. The computer program product as described in claim 15 wherein the method further comprises:
identifying a resource identifier corresponding to the requested resource, wherein the service login identifier includes a component derived from the resource identifier.

20. The computer program product as described in claim 15 wherein the method further comprises:
determining that the requested resource is a client-specific resource;
retrieving client-specific resource request data included in the resource request;
provisioning the client-specific resource based upon the client-specific resource request data; and
assigning a resource identifier to the provisioned client-specific resource, wherein the resource URL is derived from the resource identifier.

21. The computer program product as described in claim 15 further comprising:
identifying a normal login identifier corresponding to the client, the means for identifying including:
locating an order corresponding to the service login identifier;
retrieving the normal login identifier from the located order;
retrieving a stored password that corresponds to the normal login identifier; and
authenticating the password by comparing the password to the stored password.

22. A computer-implemented method for providing a resource to a client connecting to a service provider, said method comprising:
receiving a resource request from the client over a first session;
creating a service login identifier in response to the resource request;
in response to the creating, storing one or more session attributes corresponding to the service login identifier, wherein the session attributes include a resource URL corresponding to the location of the requested resource;
returning the service login identifier to the client over the first session;
receiving a session request from the client, wherein the session request includes the service login identifier and a password;
establishing a second session between the service provider and the client in response to the session request;

providing the resource URL to the client over the second session;
receiving a connection request from the client, the connection request including the service login identifier and the resource URL;
establishing a connection with the client based upon the resource URL;
using the connection to provide the requested resource to the client;
determining that the requested resource is a client-specific resource;
retrieving client-specific resource request data included in the resource request;
provisioning the client-specific resource based upon the client-specific resource request data;
assigning a resource identifier to the provisioned client-specific resource; and
deriving the resource URL that corresponds to the requested resource from the resource identifier.

23. A computer-implemented method for providing a resource to a client connecting to a service provider, said method comprising:
receiving a resource request from the client over a first session;
creating a service login identifier in response to the resource request;
in response to the creating, storing one or more session attributes corresponding to the service login identifier, wherein the session attributes include a resource URL corresponding to the location of the requested resource;
returning the service login identifier to the client over the first session;
receiving a session request from the client, wherein the session request includes the service login identifier and a password;
establishing a second session between the service provider and the client in response to the session request;
providing the resource URL to the client over the second session;
receiving a connection request from the client, the connection request including the service login identifier and the resource URL;
establishing a connection with the client based upon the resource URL;
using the connection to provide the requested resource to the client;
receiving an order from the client, the order corresponding to the requested resource;
identifying a price for the requested resource;
billing the price of the resource to an account corresponding to the client;
creating an order identifier for the order;
identifying a normal login identifier corresponding to the client, the identifying including:
locating the order corresponding to the order identifier; and
retrieving the normal login identifier from the order;
retrieving a stored password that corresponds to the normal login identifier; and
authenticating the password by comparing the password to the stored password.

24. An information handling system comprising:
one or more processors;
a memory accessible by the processors;
a network interface connecting the information handling system to a client through a computer network; and
a resource deployment tool for providing a resource to the client over a content-specific network session, the resource deployment tool including:
means for receiving a resource request from the client over a first session;
means for creating a service login identifier in response to the resource request;
in response to the creating, means for storing one or more session attributes corresponding to the service login identifier, wherein the session attributes include a resource URL corresponding to the location of the requested resource;
means for returning the service login identifier to the client over the first session;
means for receiving a session request from the client, wherein the session request includes the service login identifier and a password;
means for establishing a second session between the service provider and the client in response to the session request;
means for providing the resource URL to the client over the second session;
means for receiving a connection request from the client, the connection request including the service login identifier and the resource URL;
means for establishing a connection with the client based upon the resource URL;
means for using the connection to provide the requested resource to the client;
means for determining that the requested resource is a client-specific resource;
means for retrieving client-specific resource request data included in the resource request;
means for provisioning the client-specific resource based upon the client-specific resource request data;
means for assigning a resource identifier to the provisioned client-specific resource; and
means for deriving the resource URL that corresponds to the requested resource from the resource identifier.

25. A computer program product stored in a computer operable media, the computer operable media containing instructions for execution by a computer, which, when executed by the computer, cause the computer to implement a method for providing a resource to client connecting to a service provider, the method comprising:
receiving a resource request from the client over a first session;
creating a service login identifier in response to the resource request;
in response to the creating, storing one or more session attributes corresponding to the service login identifier, wherein the session attributes include a resource URL corresponding to the location of the requested resource;
returning the service login identifier to the client over the first session;
receiving a session request from the client, wherein the session request includes the service login identifier and a password;
establishing a second session between the service provider and the client in response to the session request;
providing the resource URL to the client over the second session;
receiving a connection request from the client, the connection request including the service login identifier and the resource URL;
establishing a connection with the client based upon the resource URL;

using the connection to provide the requested resource to the client;
determining that the requested resource is a client-specific resource;
retrieving client-specific resource request data included in the resource request;
provisioning the client-specific resource based upon the client-specific resource request data;

assigning a resource identifier to the provisioned client-specific resource; and deriving the resource URL that corresponds to the requested resource from the resource identifier.

* * * * *

UNITED STATES PATENT AND TRADEMARK OFFICE
CERTIFICATE OF CORRECTION

PATENT NO. : 7,089,316 B2
APPLICATION NO. : 10/160909
DATED : August 8, 2006
INVENTOR(S) : Andersen et al.

It is certified that error appears in the above-identified patent and that said Letters Patent is hereby corrected as shown below:

On title page (item 54) and column 1
In the Title of the patent, please delete "DEVELOPMENT" and substitute --DEPLOYMENT--

Signed and Sealed this

Third Day of October, 2006

JON W. DUDAS
*Director of the United States Patent and Trademark Office*